United States Patent [19]

Latter et al.

[11] 4,354,565

[45] * Oct. 19, 1982

[54] ENGINE SYSTEM USING LIQUID AIR AND COMBUSTIBLE FUEL

[75] Inventors: Albert L. Latter, Marina del Rey; R. Philip Hammond; James L. Dooley, both of Santa Monica, all of Calif.

[73] Assignee: R & D Associates, Marina del Rey, Calif.

[*] Notice: The portion of the term of this patent subsequent to Oct. 7, 1997, has been disclaimed.

[21] Appl. No.: 73,894

[22] Filed: Sep. 10, 1979

Related U.S. Application Data

[63] Continuation-in-part of Ser. No. 958,056, Nov. 6, 1978, Pat. No. 4,226,294.

[51] Int. Cl.³ .................. B60K 3/02; F01K 25/06
[52] U.S. Cl. .................... 180/54 B; 60/671; 180/296; 180/303
[58] Field of Search .............. 180/54 B, 303, 304, 180/302, 309, 301; 60/668, 679, 651, 676, 672, 683, 671, 659, 662

[56] References Cited

U.S. PATENT DOCUMENTS

| | | | |
|---|---|---|---|
| 2,404,938 | 7/1946 | Armacost | 60/683 |
| 2,420,335 | 5/1947 | Nettel et al. | 60/683 |
| 3,257,806 | 6/1966 | Stahl | 60/36 |
| 3,277,651 | 10/1966 | Augsberger | 60/679 |
| 3,339,663 | 9/1967 | Anderson | 180/304 |
| 3,451,342 | 6/1969 | Schwartzman | 60/651 |
| 3,531,933 | 10/1970 | Baldwin | 60/651 |
| 3,565,201 | 2/1971 | Petsinger | 180/54 B |
| 3,589,126 | 6/1971 | Zotto | 60/36 |
| 3,613,385 | 10/1971 | Hogan et al. | 60/651 |
| 3,826,096 | 7/1974 | Hrusch | 60/709 |
| 3,830,326 | 8/1974 | Hartung | 180/303 |
| 3,986,359 | 10/1976 | Manning et al. | 60/671 |
| 3,986,575 | 10/1976 | Eggmann | 180/302 |
| 3,987,632 | 10/1976 | Pereda | 60/671 |
| 3,998,059 | 12/1976 | Randell | 60/671 |
| 4,050,536 | 9/1977 | Pristash | 180/303 |
| 4,226,294 | 10/1980 | Latter et al. | 180/54 B |

FOREIGN PATENT DOCUMENTS

| | | | |
|---|---|---|---|
| 2524261 | 12/1975 | Fed. Rep. of Germany | 60/671 |
| 27153 | of 1899 | United Kingdom | 60/671 |

OTHER PUBLICATIONS

Gas Turbine for Stock Car, "Motor Magazine", Apr. 1954.

Primary Examiner—David M. Mitchell
Attorney, Agent, or Firm—Poms, Smith, Lande & Rose

[57] ABSTRACT

An automobile engine runs on liquid air plus a small amount of solid or liquid fossil fuel. The liquid is an efficient method of storing the energy of liquefaction. To get extended range and use of energy effectively some fuel is used to increase the temperature of this gas before it is introduced into the expansion engine. Two methods of using this fuel may be employed—one burns fuel internally in the expansion engine cylinders essentially at constant volume so a liquid form of the fossil fuel must be used; while the second method heats the gaseous working medium at constant pressure external from the expansion engine in a furnace so it can burn a wide range of either liquid or solid fossil fuels.

With either system of operation the air/nitrogen as liquid is pumped at the rate of use from the insulated cold storage container up to high intial operation pressure (about 200 atmospheres) then passes through heat exchangers to bring it up to the intial temperature for expansion. Since the liquid and gas is at very low temperature (77° Kelvin - 196° C., - 320° F.) much of this heating energy can be drawn from the ambient air and surrounding equipment. In either system each expansion stage utilizes a properly sized reciprocating piston in a cylinder with exhaust valving and variable cutoff inlet valving (for efficient torque and speed variation). Pistons from all of the several expansion stages are coupled to a common power output.

These engine exhaust gases may be employed to warm the intially cold high pressure liquid air in a counter-current heat exchanger.

10 Claims, 10 Drawing Figures

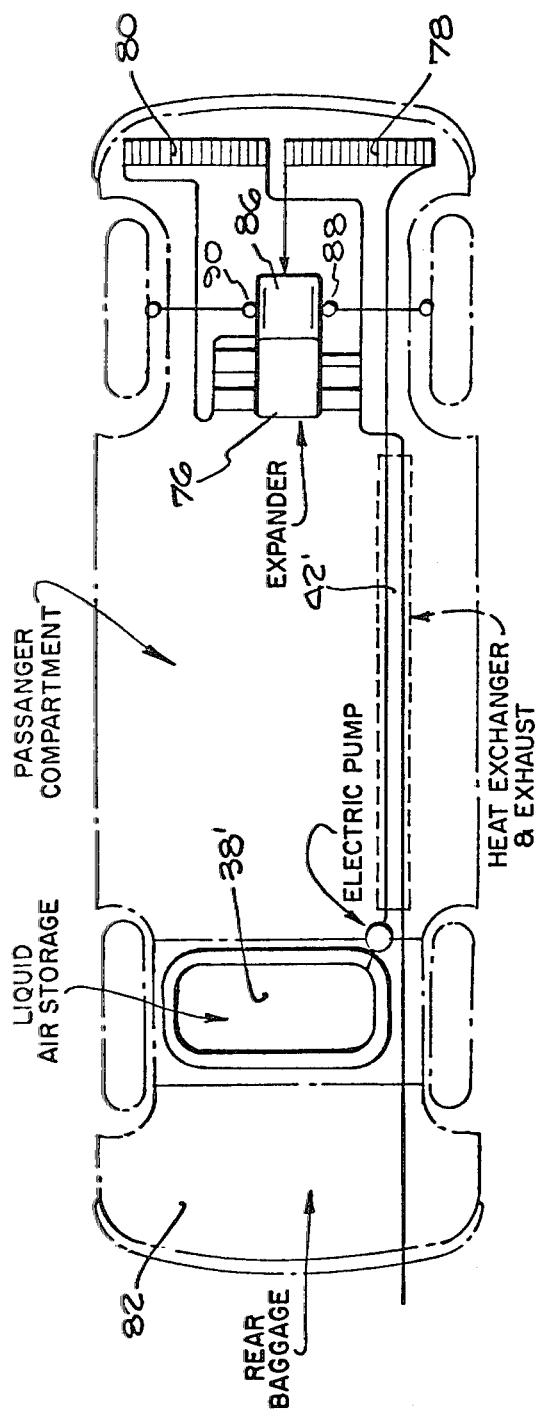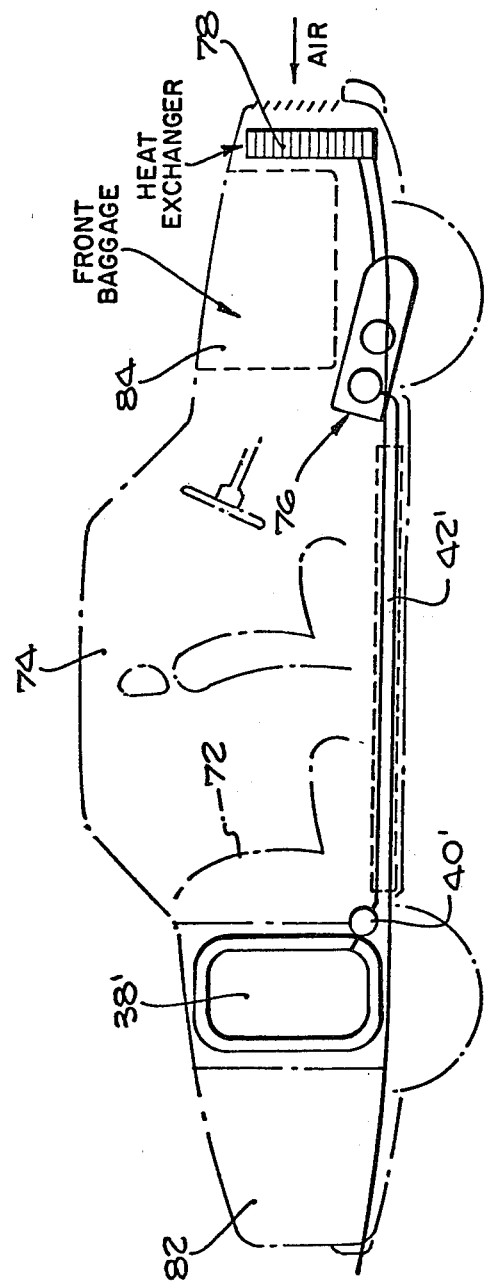

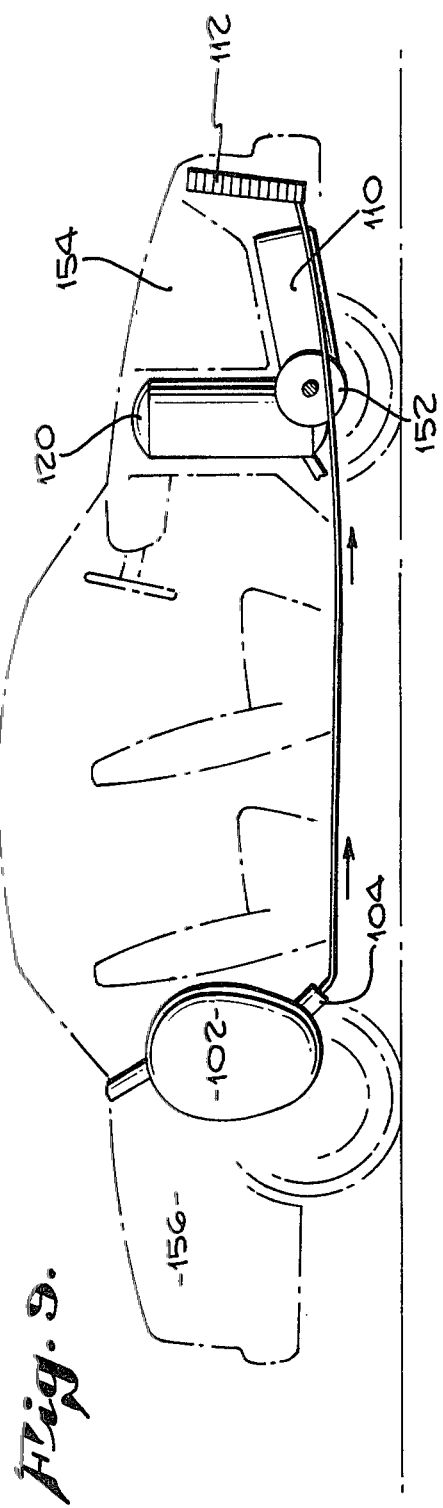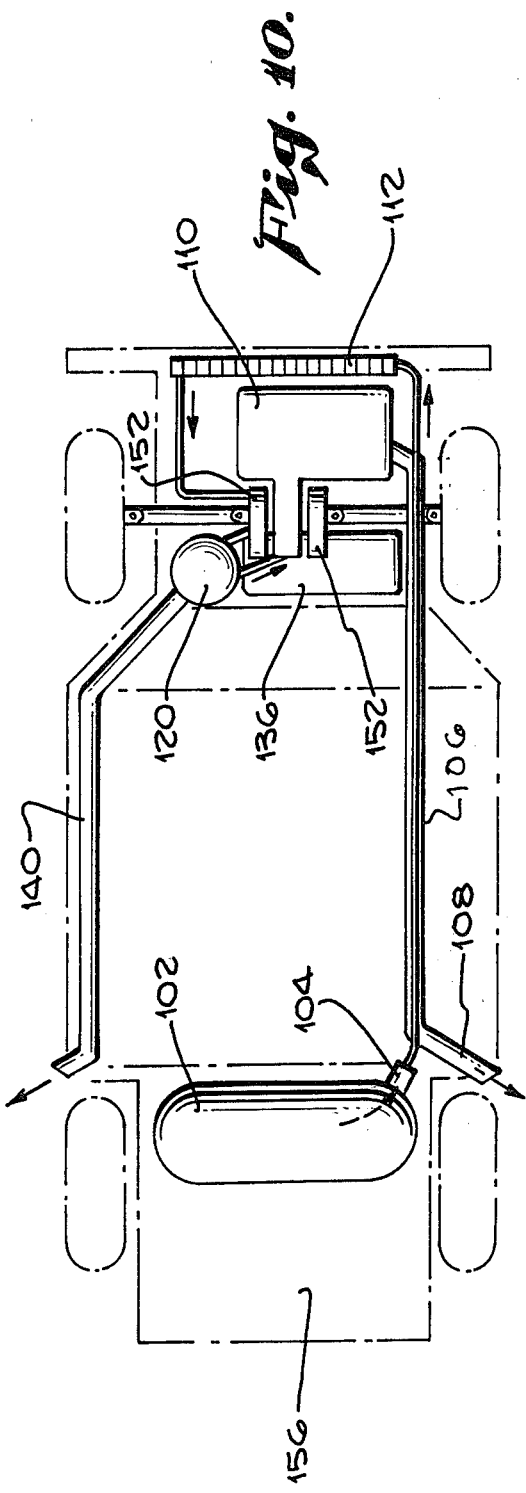

ENGINE SYSTEM USING LIQUID AIR AND COMBUSTIBLE FUEL

RELATED PATENT APPLICATION

This patent application is a continuation in part of our co-pending U.S. Patent Application, Ser. No. 958,056 filed Nov. 6, 1978 now U.S. Pat. No. 4,226,294.

FIELD OF THE INVENTION

This invention relates to engines operating on liquified gas as the principal energy source.

BACKGROUND OF THE INVENTION

It has previously been proposed to store energy in the form of a lquified gas, such as liquid nitrogen or liquid oxygen. Either of these liquids or their natural mixture, liquid air, can be stored and transported in a well-insulated vessel. Energy may be recovered for use from this liquified gas by three simple steps:

1. Pressurization of the liquid to a high pressure by pumping.
2. Vaporization of the cold liquid and heating of the gas with air from the ambient environment.
3. Expansion of the gas from high pressure to atmospheric pressure in an appropriate engine expander to do useful work.

As noted above, the foregoing has been previously proposed, but the results are so poor that it is of little use for ordinary transportation. A heavy load of liquified gas is required for any reasonable range in an automotive application, and the operating cost is unacceptably high. However, the system does have a number of favorable features including low pollutant levels, and the fact that liquid hydrocarbon fuels are not directly consumed.

Accordingly, a principal object of the present invention is to improve the fuel efficiency and range of automobiles and other engines operating on liquified gas, so that they are competitive with conventional internal combustion engines.

Two methods of accomplishing this objective are disclosed in this specification.

SUMMARY OF THE INVENTION

In accordance with the present invention, a composite engine cycle is employed in which liquified gas, such as liquid air or liquid nitrogen, is expanded and warmed both from the ambient and also by combustion of suitable fuels, either on an internal or an external combustion basis. When liquid air is used, the oxygen in the air itself may enter into the combustion process, both in the case of internal and external combustion.

From one standpoint one embodiment of the invention may be considered to use a special temperature topping cycle for the liquified air or nitrogen, using any convenient fuel such as gasoline, diesel, or the like, after taking as much substantially isothermal expansion as is practical. In this new composite cycle, the liquified gas is first pumped to high pressure and warmed by heating with atmospheric air as in prior systems, and is partially expanded, after which it is reheated and expanded partially again several times, thus approaching isothermal expansion. At the point where it is not practical to continue this process, the gas is heated to a higher temperature by the internal burning of a small amount of injected fuel with the oxygen available from the liquid air. This heat injection at substantially constant volume raises the cylinder pressure to the point where the gas can be expanded adiabatically down to atmospheric pressure with the exhaust temperature in the order of ambient temperature. This process not only enables us to get more energy from the cold gas, but also uses the heat energy injected by the fuel in a more efficient manner.

It is to be understood that various combinations of gas expansion without fuel being added, and two or more cycles of heating gas by the addition of combustible fuel, may be employed.

Another embodiment of the invention uses external combustion where heating may take place at constant pressure, while in the case of internal combustion the heating occurs at substantially constant volume.

The resulting engines can thus achieve a more acceptable mileage on the cryogenic liquid and a truly phenomenal mileage on the combustible fuel, in accordance with the analysis set forth in the body of the present specification. The combined cost of these two consumables in the new engine cycles is thereby reduced to a level of practical interest.

Additional aspects of the invention involve (1) counter current heat exchange arrangements for heating the incoming pressurized liquid air or nitrogen with the warm exhaust gases; (2) selectively directing a portion of the liquid air from the engine to the external combustion unit; and (3) utilizing heat exchangers to pick up ambient heat where possible, for example, from conventional automobile radiator locations, as well as heat from engine friction losses and from vehicle braking.

The present invention is particularly advantageous for use in automobiles. Thus, by way of example and not limitation, the liquid air storage container could be located toward the rear of the vehicle, behind the passenger compartment and the engine toward the front. Then, the liquid air could be heated as it is brought forward, and the exhaust or exhausts, from the engine and or furnace could be directed rearward in heating exchanging relationship with the cold gas conduit. Similarly, when used in combination with an automobile, the presently proposed power plant has a number of conveniently available sources of heat, including radiator absorption engine frictional heat, and the like, as discussed above, all of which may be employed to add energy to the (originally) liquified gas.

The present invention has the following advantages:

1. It greatly extends the mileage attainable on fossil fuel.
2. It reduces dependence on liquid fossil fuel.
3. It may utilize a wide variety of types of fuels.
4. The liquid gas or air consumable can be "recharged" at reasonable cost anywhere there is electric power and a cryostat available.
5. There is no long distance transportation problem with the liquid air, as it can be readily made from the atmosphere anywhere.
6. The exhaust from the automotive powerplant is exceptionally cool and clean—well within all proposed legal limits of emissions without the need for catalytic converters, exhaust recirculation, or the like.

It is further noted that the combinational use of liquid air and a combustible fuel for automotive propulsion will provide a greater operative range than both of the fuels when used alone. More specifically, for example, a mid-sized car could travel about 66 kilometers on 190 kilograms of liquid air using a pure liquid air engine, and could travel about 134 kilometers on nine kilograms of diesel oil in a car using a diesel engine. This makes a total of 200 km, using the two propulsion sources separately. However, because of the complementary nature of the two propulsion materials, a combinational external combustion engine, using 190 kg liquid air and 9 kg of diesel fuel has a range of 300 kilometers, as compared with the 200 kilometer figure noted above. This increase of 100 kilometers or 50% is a product of the remarkable synergistic combination of the two diverse fuels in the system as disclosed herein.

Other objects, features, and advantages of the invention will become apparent from a consideration of the following detailed description and from the accompanying drawings.

BRIEF DESCRIPTION OF THE DRAWINGS

FIGS. 4 and 5 are diagrammatic showings of a conventional passenger automobile equipped with an engine in accordance with the principles of the invention;

FIGS. 9 and 10 are schematic showings of a side view and a plan view, respectively, of one possible automotive installation for the system of FIG. 7.

DETAILED DESCRIPTION

Figure 1:
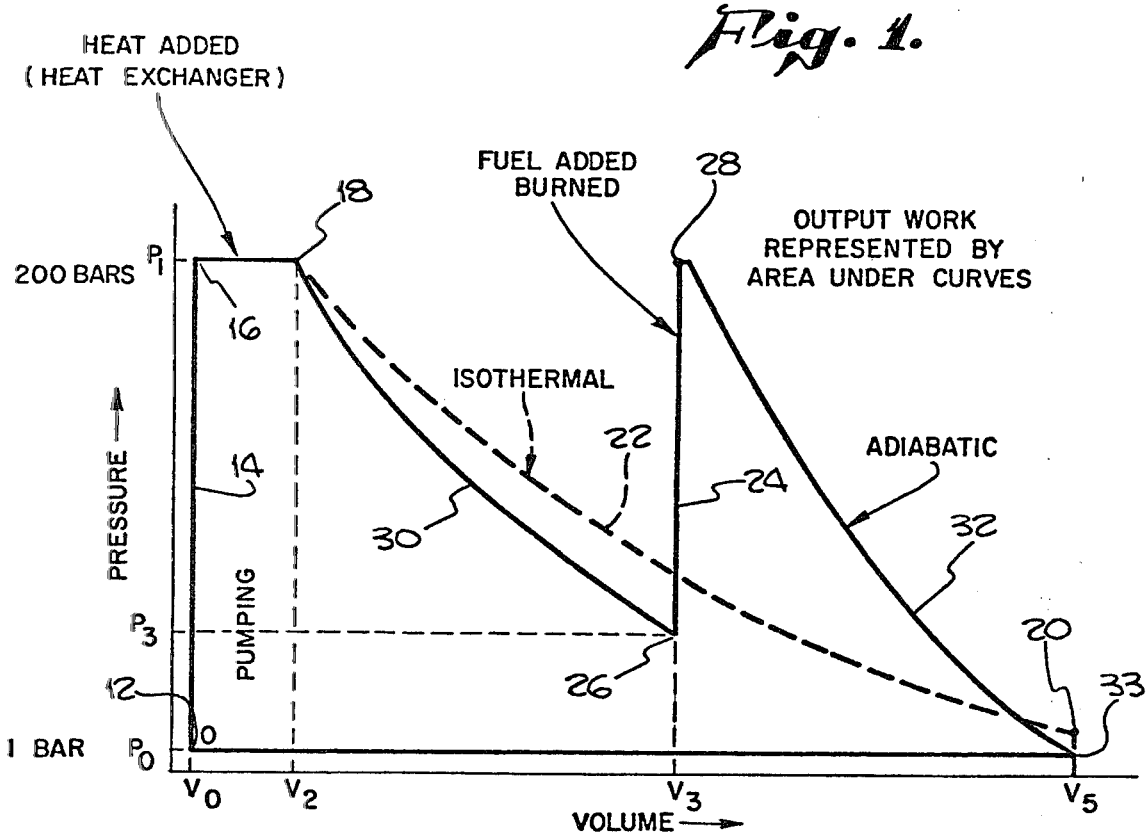
FIG. 1 is a simplified typical theoretical pressure-volume diagram illustrating the principles of the present invention using internal heating.

Referring more particularly to the drawings, FIG. 1 is a pressure-volume diagram which provides a general comparison of the mode of operation of the apparatus of the type of the present invention, as compared with prior known engines operating with initially cryogenic fluids. More specifically, point 12 in FIG. 1 represents liquid air stored at atmospheric pressure prior to utilization in the engine. Normally the liquid air would be stored in a properly insulated tank, as it is at a temperature in the order of 77° Kelvin. For reference, on the Kelvin scale, absolute zero is designated "O", and freezing and boiling temperatures for water are approximately 273° K. and 373° K., respectively.

Returning to FIG. 1, the initial step as represented by the line segment 14, extending from starting point 12 to point 16, is to pump the liquid air to an elevated pressure, which may for example be 200 atmospheres, or 200 bars, with little or no change in specific volume. The pressurized liquid air is then passed through heat exchangers, and the resultant phase change from liquid to gas is represented by the line segment between point 16 and 18 in FIG. 1, involving a volume change.

In comparing what has been previously done with the mode of operation of the apparatus of the present invention, attention is directed to point 20 which is at the far right in FIG. 1. This point represents air at one atmosphere or one bar of pressure, and its volume at a temperature approximating ambient as the expansion from point 18 was along the dashed line 22 isothermally (at constant temperature). Following dashed line 22 implies that ambient heat is added throughout the expansion process. Solid line 30 represents a more practical expansion which approaches adaibatic conditions where little heat is added during the expansion process.

After expansion along the adiabatic line 30 the gas becomes cold. This embodiment of the present invention involves the addition of heat by the internal burning of fuel, as repretween points 26 and 28 in the solid line characteristic of FIG. 1. Accordingly, following an expansion and the accomplishing of useful work as indicated by line segment 30 extending from point 18 to point 26, the initially cryogenic liquid is heated to a temperature well above the ambient, and the pressure is increased to a high pressure such as the 200 bar level of point 16. Additional work is performed by the heated and compressed gas, as indicated by the expansion line segment 32 which extends on to a final point 33 which is at atmospheric pressure and at which temperature is in the order of the ambient.

The work performed by the cryogenic fluid as it expands is represented by the area under the curves. In the case of the present invention, in accordance with one exemplary cycle of operation, the work performed is represented by the area under the curve extending from point 16 to point 18, and then along line segment 30 to point 26, up along line segment 24 to point 28, and then along line segment 32 to point 33.

In a scale graph, the area under the solid line curve 18, 26, 28, 33 including line segments 30 and 32, is much greater than the area lying under curve 22. Further, as set forth quantitatively below, the amount of fuel required to increase the temperature and the pressure of the gas from point 26 to point 28 is relatively small, compared with the additional work which is obtained.

Incidentally, it may be noted that the line segment 30 is designated as being "isothermal", whereas the line segment 32 is designated as being "adiabatic". The cycle is normally quite rapid in a practical engine, and there is little opportunity for the absorption of heat. Accordingly, the temperature normally drops exponentially proportional to the increase in gas volume. When a series of steps are undertaken in the expansion of the gas, with a heat exchanger being employed between each successive expansion, the resultant characteristic may be substantially "isothermal". This mode of operation is indicated by the line 30, and it is understood that this might actually be made up of a series of short adiabatic expansions together with the intermediate usage of heat exchangers to increase the temperature of the gas following the adiabatic expansion and resultant cooling of the gas. Incidentally, in considering the plot of FIG. 1, the last expansion to point 20 might well be at a temperature somewhat below the ambient, because it immediately follows an adiabatic expansion as represented by line segment 32.

Before proceeding to consideration of the implementation of the present invention, it is useful to note the properties of air, and its principal components, nitrogen and oxygen. In this connection, it is noted that air is made up of about 4/5ths nitrogen and 1/5th oxygen with a few minor trace gases which are not of great significance in connection with the present invention. In the following table, some of the pertinent thermodynamic and other properties of nitrogen, oxygen, and air are set forth.

TABLE I

| | Nitrogen | Air | Oxygen |
|---|---|---|---|
| Symbol | $N_2$ | — | $O_2$ |
| Molecular weight | 28.0 | — | 32.0 |
| Liquid boiling temp, °K. | 77.0 | — | 90.0 |
| Liquid density gm/cm$^3$ | 0.81 | 0.87 | 1.14 |
| Latent heat of vaporization ergs/gm × 10$^9$ | 4.27 | 4.23 | 4.02 |
| Electric power to liquefy (theoretical) kWh/kg | 0.12 | 0.12 | 0.13 |
| kWh/gallon | 0.33 | 0.33 | 0.34 |
| Electric cost at 3 cents kWh and 25% plant efficiency cents/gallon | 3.96 | 3.96 | 4.00 |

From the foregoing table, the liquid boiling temperature of nitrogen and oxygen of 77° Kelvin and 90° Kelvin may be noted. In the centigrade scale, this means that oxygen boils at −183° and nitrogen at −196°; and in the Fahrenheit scale, the respective figures are approximately −297° and −320°. Accordingly, in the storage of these very cold liquids, it is necessary to have well-insulated containers.

Figure 2:
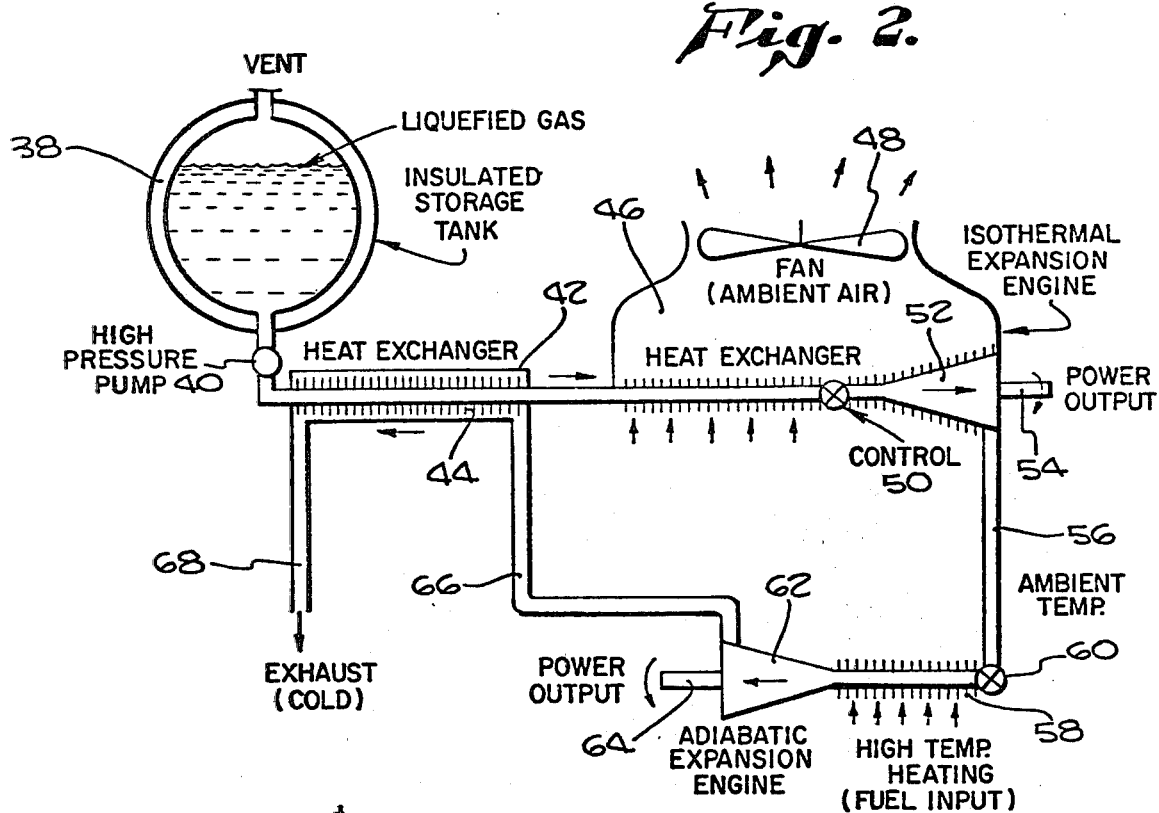
FIG. 2 is a diagrammatic showing of a power plant employing the principles of the present invention per FIG. 1.

Now, referring to FIG. 2, in this schematic representation of an engine, the liquified gas is stored in the insulated storage tank 38, and this would correspond to the starting point 12 of the pressure volume plot of FIG. 1. From the tank 38 the liquified gas is pumped up to a high pressure by the pump 40, corresponding to section 14 in the plot of FIG. 1. From the pump 40, the gas passes through a counter flow heat exchanger 42 in which the warm exhaust from the output of the engine is employed to heat up the incoming liquid gas and change it into the gaseous state. The fins 44 in the heat exchanger 42 enhance heat transfer. A larger heat exchanger 46 draws air from the ambient by means of the fan indicated diagrammatically at 48, and further increases the temperature of the gas from the heat exchanger 42. This section of the cycle corresponds to the horizontal line between points 16 and 18 in FIG. 1. Under the control of valving 50, the gas is supplied to an expansion engine 52, which provides power to the output shaft 54. Known types of expansion engines may be employed, with the simplest form being a piston in a cylinder to which the high pressure gas is supplied, with the energy being employed to move the piston and the power take-off mechanisms connected to it.

At the output 56 from the first stage expansion engine 52, the gas is still at an elevated pressure, but may be at a temperature below ambient. After valving 60, in the heating apparatus 58, the gas is raised to an elevated temperature and pressure by periodically burning fuel prior to being used in the adiabatic expansion engine 62. Power output from engine 62 is indicated at shaft 64. The exhaust gases from engine 62 are transmitted through conduit 66 to the outer zone of the countercurrent heat exchanger 42, and are cooled as the incoming liquified gas changes to the gaseous state. Accordingly, the exhaust gases at 68 from the engine are relatively cool.

Concerning the unit 58 where additional fuel, such as gasoline is supplied and burned, this may be either external combustion with no chemical interaction with the original liquified gas supplied in the tank 38; or alternatively, the gasoline may be burned with the oxygen present as one component of the liquified air originally supplied in tank 38. However, the heat must be added intermittently after closure of valve 60 to insure a constant volume pressure rise as shown by line 24 on FIG. 1. When the internal combustion alternative is employed, the inert nitrogen and the combustion products are both supplied to the adiabatic expansion engine 62.

Figure 3:
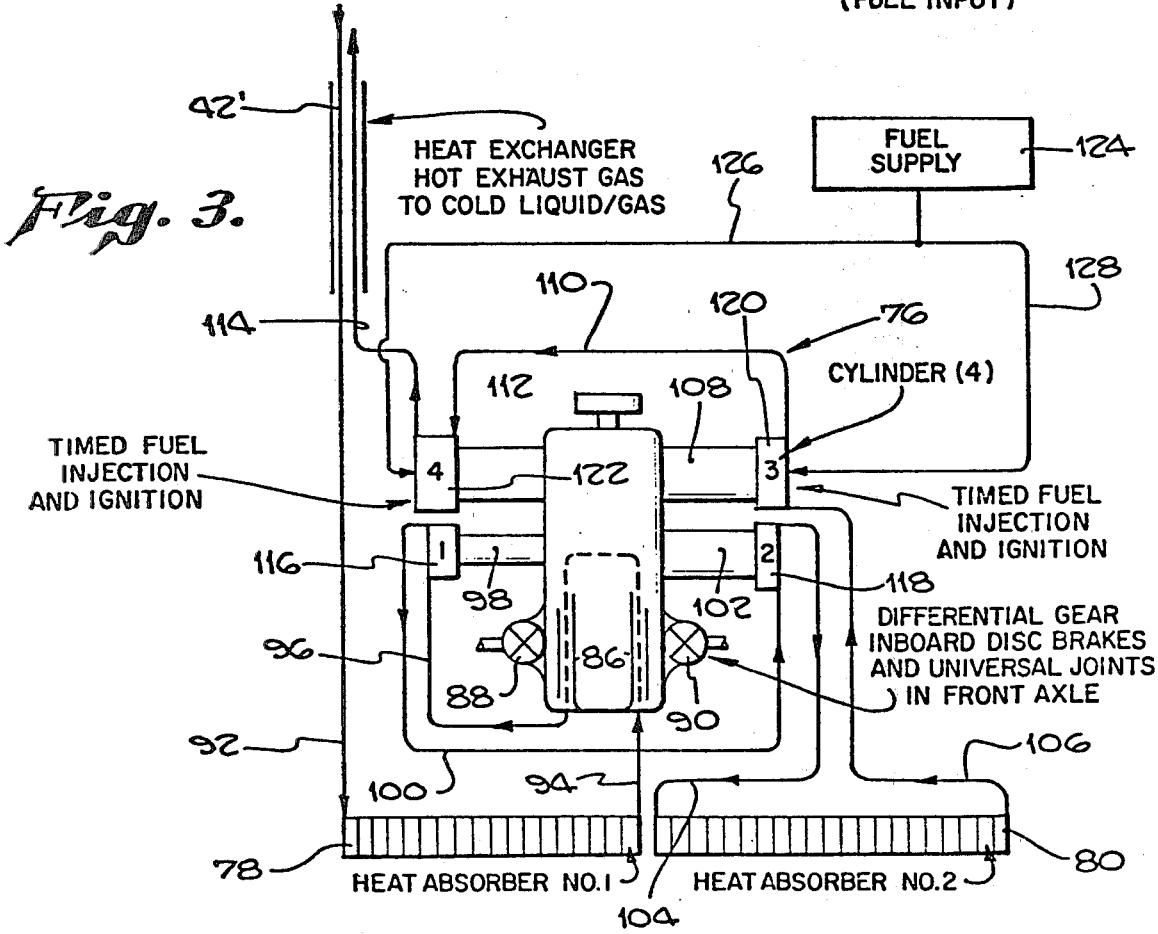
FIG. 3 is a diagrammatic showing of an automotive engine employing liquid air and gasoline fuel injection in an internal combustion engine.

FIGS. 3, 4 and 5 will now be considered together. These three figures are a schematic showing of one illustrative installation of an expansion engine in accordance with the present invention, mounted in a conventional passenger car.

Referring first to FIGS. 4 and 5, the location of the insulated storage tank 38' may suitable be behind the rear seat 72 of the vehicle 74. The high pressure pump 40' and the heat exchanger 42' may be located as indicated in FIGS. 4 and 5 with the high pressure pump immediately adjacent the tank 38', and the heat exchanger 42' extending from the vicinity of the pump 40' in the rear of the vehicle up to the vicinity of the expansion engine 76. The heat exchangers 78 and 80 may suitably be located at the front of the vehicle, generally in the location of conventional automobile radiators. A rear baggage compartment 82 is somewhat reduced in capacity in view of the relatively large size required for the liquid air storage tank 38'; however, the expansion engine 76 is substantially smaller than a conventional automobile engine and a front baggage compartment 84 may therefore also be provided.

Figure 6:
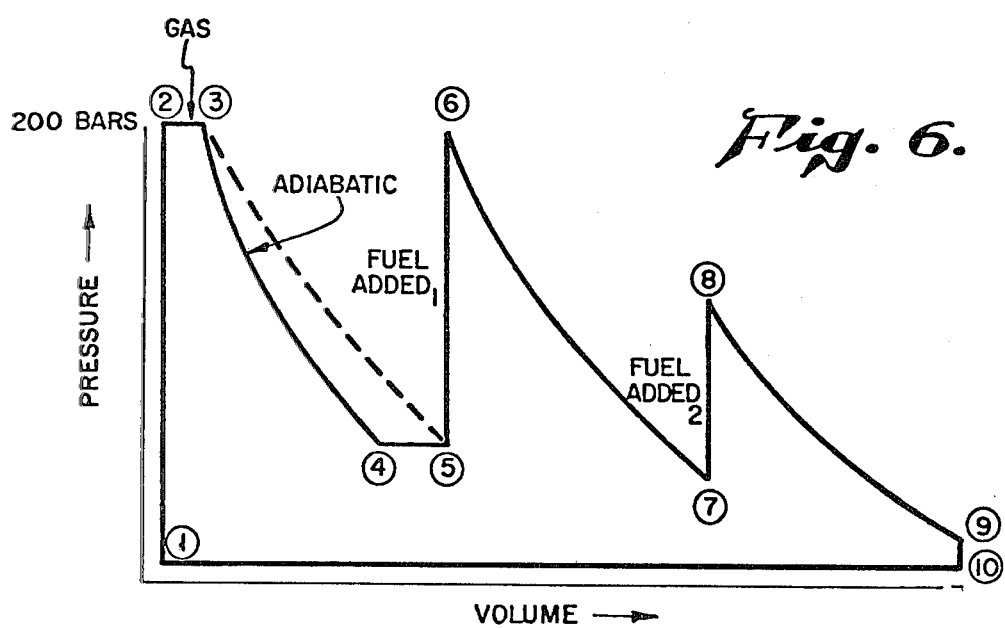
FIG. 6 is a typical pressure-volume diagram for the engine of FIG. 3.

FIG. 6 is a pressure-volume diagram indicating the mode of operation of the engine of FIG. 4 where two constant volume heat injections are used. In addition, Table II indicates the pressure, the volume and the temperature at various points in the engine of FIG. 3, for a typical operating cycle.

In FIG. 6, there are a number of encircled numbers at the break points of the various line and curve segments. These encircled numbers running from "1" to "10" correspond exactly to the "stations", as listed in Table II set forth below. In addition, in Table II, the precise points corresponding to each of the stations are indicated in parenthesis immediately after the station numbers.

TABLE II

| Station | Pressure Bars | Specific Volume (cc/gm) | Temp. (°K.) |
|---|---|---|---|
| 1 (in tank 38') | 1 | 1.15 | 77° |
| 2 (output of pump 40') | 200 | 1.15 | 77 |
| 3 (in conduit 96) | 200 | 6.27 | 400 |
| 4 (in conduit 104 after cyl. 102) | 50 | 16.78 | 268 |
| 5 (after heat absorber 80) | 50 | 18.85 | 300 |
| 6 (after fuel injection 120) | 200 | 18.85 | 1200 |
| 7 (conduit 110) | 20 | 104 | 659 |
| 8 (after second fuel injection 122) | 36 | 104 | 1200 |
| 9 (after expansion cyl. 112) | 5.5 | 416 | 738 |
| 10 (exhaust) | 1 | 1400 | 450 |

Incidentally, the vehicle shown in FIGS. 3, 4, and 5 is provided with a differential gear box 86, and inboard disc brakes 88 and 90, which are cooled by the liquid air flow, thereby picking up all available heat losses in the system—and saving consumable.

Now, referring to the flow of gas in the schematic showing of FIG. 3, the high pressure air from the countercurrent flow heat exchanger 42' is routed through conduit 92 to the heat absorber unit 78 and then through the conduit 94 through the differential 86 and the disc brakes 88 and 90. The high pressure air is then supplied through conduit 96 to the first stage expansion piston 98. From piston 98, it is routed through the conduit 100 to the second stage expansion piston 102. More ambient heat is absorbed in the heat absorber 80, with the gas path being determined by the conduits 104 and 106, with conduit 106 routing the warmed air to the cylinder 108. At cylinder 108, gasoline or other suitable fuel is injected and burned, raising the temperature of the gas to a level such as 1200° K., prior to expansion in cylinder 108. The output gases from cylinder 108 are routed by the conduit 110 to the final expansion cylinder 112, where additional fuel is added prior to the final extraction of work from the gas. Exhaust gases from cylinder 112 are transmitted to the countercurrent heat exchanger 42' through the conduit 114.

Suitable valving for the timed actuation of the pistons 98, 102, 108, and 112 are included in the units 116, 118, 120 and 122 associated respectively with the cylinders. In addition, the blocks 120 and 122 include suitable fuel injection arrangements to supply diffused gasoline to the air which is to be heated, with the gasoline being provided from the fuel supply 124 over fuel lines 126 and 128.

In examining Table II and FIG. 6, it may be noted that the lower left-hand corner of FIG. 6 has the reference numeral "1" which refers to Station 1, representing the conditions in the tank 38', prior to pumping. Then, each successive number represents additional points on the curve of FIG. 6 and additional stations listed in Table II. Particularly interesting features include the fact that Station "6" is at a pressure of approximately 200 atmospheres, which has been employed as a practical upper limit of pressures which can easily be handled, and also is at a temperature of 1200° Kelvin, which was taken as a temperature which could also be readily handled in accordance with known techniques.

In the case of Station "8", the pressure was only raised to approximately 36 bars, in view of reaching the temperature of 1200° K., which has been accepted as the upper limit for the purposes of the present example. It may also be noted that the curve between point "3" and point "4" is actually made up of expansions in cylinder 98 and also cylinder 102. Also, the horizontal section of the plot between points "4" and "5" represents the expansion in the heat absorber 80 shown in FIG. 3. It is believed that the remainder of the information supplied by FIG. 6 and Table II are self-explanatory.

A number of prior art references showing various expansion engines are listed below at the end of this specification; however, none of these prior patents disclose the supplying of additional fuel to the engine systems to increase the overall power output and efficiency, nor do they disclose the specific advantageous arrangements utilized in accordance with the present invention of supplying fuel to the air engine and burning this supplemental fuel in order to greatly increase the efficiency of the engine. The following patents are cited as relating to engines utilizing gas expansion, with many of the cited patents disclosing the use of liquid nitrogen or liquid air.

A rough fuel cost comparison has been made for the engine of the type disclosed herein as compared with conventional standard internal combustion gasoline powered engines. More specifically, assuming that gasoline will cost $1.00 a gallon, excluding road tax considerations, and that liquid air will cost approximately 10 cents a gallon exclusive of tax, when produced in quantity, the propulsive fuel cost of a standard gasoline powered engine will be approximately 3.10 cents per kilometer, or approximately 5 cents per mile, while the cost of the liquid air/gasoline fuel powered engine will be approximately 2.5 cents per kilometer or approximately 4.0 cents per mile.

In Table III set forth below, the weight comparison of a present gasoline auto is compared with that of a cold engine auto, using a full load of fuel. For the purposes of Table III, we are using a full sized American car averaging about 20 miles per gallon of gasoline. On the basis of $4.3 \times 10^{11}$ ergs/gram (18,500 Btu/lb) from the combustion of gasoline, 15% average engine efficienty, about $5.5 \times 10^9$ ergs are required at the engine flywheel for every meter travelled. This average energy requirement has been employed in the calculations for Table III.

The illustrative example of our engine employing cryogenic and internal combustion of gasoline fuel, delivers $6.5 \times 10^9$ ergs per gram of liquid air used, to the engine output shaft when the expansion efficiency is 85%. Using these figures, 0.85 kilograms of liquid air are required for each kilometer is to be travelled. To ensure a 300 kilometer (186 miles) driving range, about 250 kilograms (85 gallons) of liquid air is required and 4.2 kilograms (1.5 gallons) of gasoline or equivalent is needed.

The weight comparison is set forth in Table III below:

TABLE III

| Weight Comparison (Full Load of Fuel) | Present Gasoline Automobile | Cold Engine Automobile |
|---|---|---|
| Engine | 420 kg | 220 kg |
| Heat Exchangers | 50 | 130 |
| Air Conditioner | 50 | Not Required |
| Fuel and Tank | 65 | 7 |
| Liquified gas and container | — | 300 |
| Exhaust | 15 | 10 |
| Total Powerplant System - kg | 600 kg | 667 kg |

In reality, the foregoing comparison is unnecessarily unfavorable as regards the cold engine auto of the present invention. More specifically, on the average, people usually drive with a gas tank or fuel supply which is not more than ⅜th of a tank of gas or other fuel. Using this figure as the average weight of the vehicle, the cold engine auto weight comes down close to that of present automobiles.

Returning to the detailed description of the figures of the drawings, attention is now directed to FIGS. 7 through 10 which are included in this continuation-in-part specification, but were not included in the prior U.S. Patent Application Ser. No. 958,056, cited hereinabove. FIGS. 7 through 10 relate to an external combustion, constant pressure embodiment of the invention.

Figure 7:
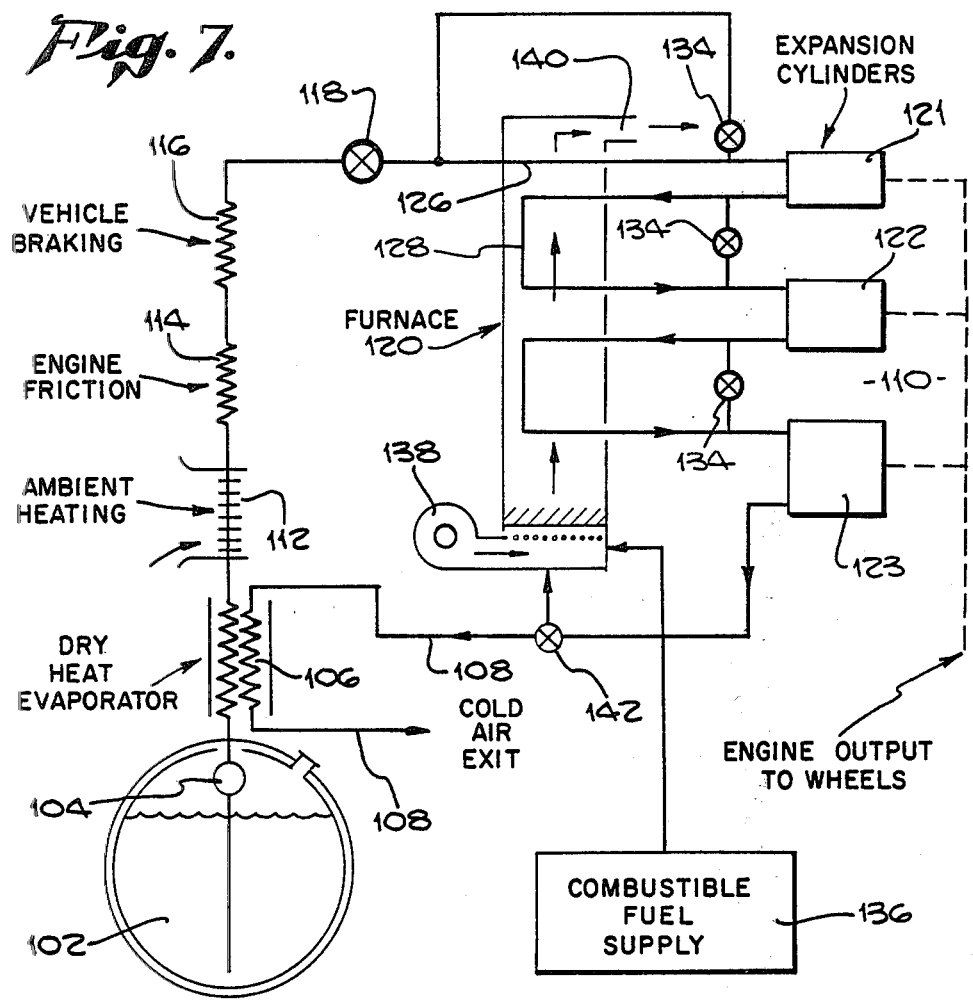
FIG. 7 is a diagrammatic showing of an external combustion embodiment of the invention.

Referring to FIG. 7 it includes the liquid storage tank 102 corresponding to the tank 38 shown in FIG. 2 and other prior figures of the drawings. From the storage tank 102, the liquid air is pumped to an elevated pressure such as 200 atmospheres, or 200 bars, by the pump 104. The high pressure liquid air is then transmitted through the dry heat evaporator, or countercurrent heat exchanger 106 for heating through transfer of heat from the exhaust gas flowing through conduit 108 from the expansion engine 110. The cold gas then passes through a heat absorber 112 or other arrangements for increasing the temperature of the cold gas toward the ambient and then through heat exchangers 114 and 116 to pick up additional heat from vehicle braking and from heat losses of other mechanical parts such as the transmission of the engine drive. The somewhat warmer air is then supplied to the power control valve 118.

The power plant itself includes a furnace 120 and a series of expansion cylinders 121 through 123 of progressively increasing size corresponding to the reduced pressure of the gases as energy is extracted in the successive cylinders. Gases from the control valve 118 are heated in passing through the furnace 120 along conduit 126, and are then supplied to the piston type expansion cylinder 121 which is, per se, of a conventional type. From expansion cylinder 121, the gases are routed back through furnace 120 through the heat exchanging conduit section 128, and then to the successive expansion cylinders 122 and 123, with additional intermediate heating stages.

In order to avoid the application of gases at excessively high temperatures to the expansion cylinders 121 through 123, a series of bypass, "temperature control" valves 134 are provided, and operated on a thermostatic basis to bypass some or all of the gases past the furnace 120 when temperatures rise beyond the maximum acceptable temperature for the expansion cylinders.

Combustible fuel is supplied from the storage container 136 to the furnace 120, and air is provided from the variable capacity air blower 138. Incidentally, when maximum power from the engine is desired, the power control valve 118 would be opened wide, and the air blower would be operated at full air capacity to provide maximum heat transfer in the furnace 120.

It may be noted in passing that the hot exhaust at the exhaust conduit 140 from the furnace 120 contains moisture or water vapor as one of the normal combustion products, and therefore is not employed directly in the cooling of the very cold air close to the tank 102, as the moisture would no doubt condense and form ice in the exhaust passages. Instead, the dry exhaust from the expansion cylinder 123 passing through line 108 is employed in the dry heat evaporator 106. Incidentally, a valve 142 may be provided to direct a portion of the exhaust air from the expansion cylinders 121 through 123 to the furnace 120. The valve 142 is designed to permit the direction of some desired fraction of the air from the expansion cylinders toward the furnace 120. By this technique, an automatic reduction in the air flow is accomplished when the engine is operating at reduced speeds or outputs. Care must be taken with regard to the use of 142 and the air from the expansion cylinder 123, as prolonged sitting of the vehicle could cause some slight oxygen enrichment, whereby the effect on combustion in furnace 120 would be increased for a given amount of exhaust gas from the expansion cylinders 121 through 123.

Figure 8:
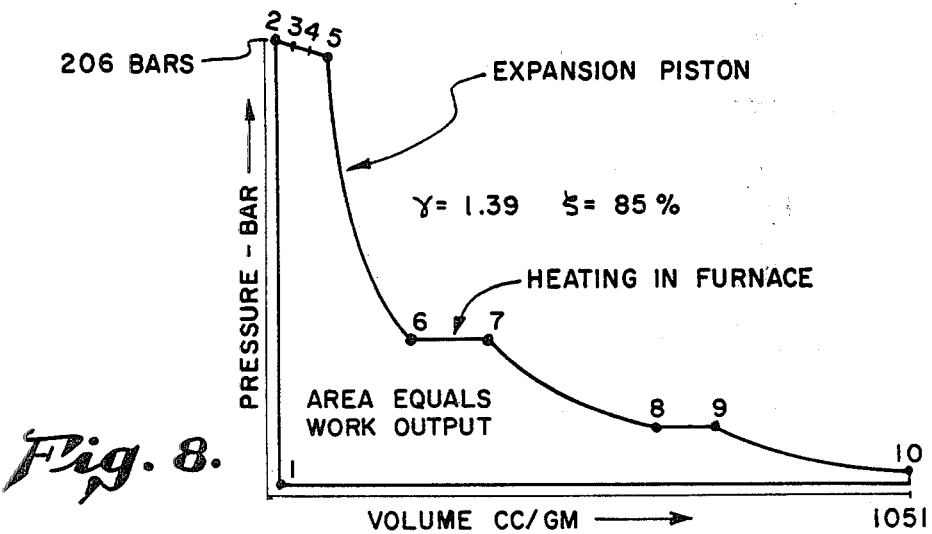
FIG. 8 is a schematic pressure-volume diagram for the system for FIG. 7.

FIG. 8 is a schematic pressure volume diagram for a continuously flowing system of the type shown in FIG. 7, with three expansion cycles of pistons. FIG. 8 is not drawn to scale. In table IV set forth below, the pressure, volume and temperature is tabulated for each of the ten stations shown in FIG. 8, with one gram of the working medium being considered to proceed through the cycle. Now, the plot of FIG. 8 will be considered on a station by station basis.

STATION 1

This station represents the liquid in the cryogenic Dewar container. The liquid air is at one atmosphere pressure, and is at 77° Kelvin (with 273° Kelvin being equal to freezing temperature of water in the Kelvin scale), and has a specific volume of about 1.15 cc. per gram.

STATION 2

The liquid air has now been pumped up to system operating pressure. A pressure of slightly above 200 bars, or 200 atmospheres (3,000 psi) is shown for illustrative purposes. The temperature is the same as in the Dewar container, and the specific volume is reduced only slightly.

STATION 3

Station 3 represents the evaporated liquid, now a gas at about ambient temperature, still at high pressure, and at greatly increased specific volume.

TABLE IV

Pressure-Volume Table Relating To FIG. 8

| STATION (Sta.) | PRESSURE (bar) | TEMPERATURE (°K.) | SPECIFIC VOLUME (cc/gm) | ENERGY (erg/gm × 10$^9$) from prior sta. |
|---|---|---|---|---|
| 1 | 1.0 | 77 | 1.15 | |
| 2 | 206.0 | 77 | ~1.15 | −0.25 |
| 3 | 204.0 | 300 | — | — |
| 4 | 202.0 | 400+ | — | — |
| 5 | 200.0 | 1000 | 15.12 | +2.75 |
| 6 | 45.0 | 695 | 46.72 | +2.32 |
| 7 | 44.0 | 1000 | 68.75 | +0.95 |
| 8 | 9.6 | 695 | 218.0 | +2.32 |
| 9 | 9.4 | 1000 | 322.0 | +0.95 |
| 10 | 2.0 | <695 | 1051.0 | +2.32 |

TOTAL WORK ON PISTONS 10.99 × 10$^9$
WORK TO OUTPUT AT 85% efficiency 9.34 × 10$^9$
HEAT INPUT FROM COAL 12.70 × 10$^9$
GRAMS COAL PER GRAM AIR 0.045

STATION 4

The air has passed through the engine crank case to pick up frictional heat losses and around the normal inboard disc brakes to pick up regenerative braking energy from the vehicle. The pressure is still in the order of 200 bars (less any pressure drop) and the temperature would be in the order of 400° K. or about 260° F.

STATION 5

At this point, the air has just come from the furnace. It is hot, in the order of about 1,000 K. (1340° F.) and ready to enter the first stage of the expansion engine.

STATION 6

Between station 5 and station 6, the gas drives one of the expansion pistons such as those shown at 121 through 124 in FIG. 7. This is a substantially isotropic expansion, and the temperature at Station 6 is in the order of 695° K. (790° F.) depending upon the expansion efficiency. This relatively cool air is then directed back to the coal or coke-fired furnace for reheating.

STATION 7

This station is similar to Station 5 except that it is at a lower pressure. The air has been reheated at constant pressure and is entering the second expansion stage. This process is repeated several times, until the pressure is too low or the volume too great for further useful expansion.

After the last expansion, the air is still warm and will be used to evaporate the incoming liquid air with this dry heat to avoid ice formation on the very cold tubes. It should be noted that the latent heat of vaporization of liquid air is about 1/10 that of water so there is adequate heat in the exhaust for vaporization.

FIGS. 9 and 10 indicate one possible arrangement of the system of FIG. 7 installed in a passenger vehicle. For convenience the reference numerals employed in FIG. 7 have been carried over to FIGS. 9 and 10. Interesting points to be noted in connection with FIG. 10 include the extended countercurrent heat-exchanger 106, which may also be referred to as a dry-heat evaporator, as the liquid air or liquid nitrogen becomes a gas during this transit. From the heat exchanger 106, the cold gas is routed through the heat absorber 112 which is located at the front of the vehicle in the place of the usual radiator. From the radiator 112, the gas is routed to the inboard brakes designated 152 in FIG. 10 where further heat is absorbed.

FIG. 9 is particularly of interest in showing the available luggage space 154 at the front of the vehicle and 156 at the rear of the vehicle. The engine 110 is relatively small and, therefore may be located below the luggage space 154.

Turning to economic considerations, on the basis of the average energy requirement when driving a mid-sized automobile (about $5.5 \times 10^5$ joules per kilometer traveled as noted hereinabove), the fuel and liquid air consumption can be predicted. The new vehicle compares favorably weightwise with present automobiles. More particularly, a standard gasoline driven automobile weighs in the order of 3,200 pounds (1454 kg) without fuel, and about 3,270 pounds (1486 kg) with fuel. On the other hand, the present liquid air-coal automobile would weight approximately 3,150 pounds (1432 kg) without fuel and about 3,520 pounds (1600 kg) with a full load of liquid air and coal. The volume of propellant required for a 300 km. (186 mile) range is larger with liquid air, but is still quite acceptable because the engine is so much smaller. Based on liquid air costing 10 cents per gallon (3.4 cents per kg), gasoline costing one dollar per gallon (36.7 cents per kg), and coal costing forty dollars per ton (4.4 cents per kg), the cost of consumables per mile traveled is about four cents for liquid air/coal and five cents for gasoline. However, we believe the cost of gasoline can only go up while the cost of liquid air should go down as the production required for widespread use increases. Coal at forty dollars per ton allows money for processing and delivering it. Accordingly, from these figures the new system is clearly competitive with prior system and will be consistent with out national goal of shifting from liquid to fossil fuels in our energy consumption.

As an important feature of the invention, it is noted that the use of liquid air or liquid nitrogen as an automotive power source is very appealing. More particularly, of course, there would be no polluting emissions from a pure liquid air vehicle, as compared with the noxious combustion products of gasoline powered cars. Fuel can be cut off and the vehicle operated on pure air whenever conditions so dictate. However, in order to give a mid-size car (3100 pounds to 3500 pounds) a range of 300 kilometers, or about 186 miles, 858 kilograms (about 1,888 pounds) of liquid air would be required. This calculation is based on a power requirement of $5.5 \times 10^5$ joules per kilometers travelled, and on the power produced as the liquid air goes from 77 degrees Kelvin to 400 degrees Kelvin. Obviously, from these figures, a pure liquid air automotive engine is impractical, as such a large proportion of the vehicle weight would be the liquid air propellant.

When a very small amount (such as five or six kilograms) of diesel fuel (or gasoline) is utilized in combination with the liquid air, however, a much different picture emerges. For constant volume internal combustion, the amount of liquid air required is only 250 kilograms (550 pounds); and for a constant pressure external combustion engine, only 190 kilograms (418 pounds) of liquid air would be required. And this remarkable change in the picture is accomplished by burning only a relatively small amount of fuel (5 or 6 kilograms of diesel fuel, or 9 kilograms of coal), which would have such low emission content that the overall result as compared to conventional cars would be to greatly reduce automotive air pollution.

The remarkable result outlined above is a result of the "synergistic" combination of liquid air as a source of energy, and conventional fuels, such as diesel fuel, gasoline or coal, and the discovery that the vehicle range from the concurrent use of these two diverse sources of energy is much greater than the sum of each one used alone.

In conclusion, it is to be understood that the foregoing description is merely illustrative of the principles of the invention, and that minor modifications are clearly within its scope. Thus, by way of example and not of limitation, instead of a reciprocating type piston engine, other known forms of engines may be employed, with positive displacement type engines being preferred. Similarly, the engine is applicable to other types of vehicles and other engines, as well as to automobile engines.

For completeness and as characterized above, the following patents relating to expansion engines using cryogenic fluids, are noted:

U.S. Pat. No. 3,257,806, granted June 28, 1966; U.S. Pat. No. 3,451,342, granted June 24, 1969; U.S. Pat. No. 3,531,933, granted Oct. 6, 1970; U.S. Pat. No. 3,589,126, granted June 29, 1971; U.S. Pat. No. 3,613,385, granted Oct. 19, 1971; U.S. Pat. No. 3,826,096, granted June 30, 1974; U.S. Pat. No. 3,987,632, granted Oct. 26, 1976; and U.S. Pat. No. 3,998,059, granted Dec. 21, 1976.

What is claimed is:

1. An automobile system utilizing a combinational engine for operating on liquified cryogenic gas and combustible fuel as energy sources comprising:
   an automobile;

an insulated tank for storing liquified cryogenic gas mounted in said automobile;

means for pumping said liquified gas to an elevated pressure above 100 bars;

first heat exchanger means for warming said high pressure liquified gas toward the ambient whereby it changes to the gaseous state;

second heat exchanger means located in the said automobile to receive heat from the ambient air and further warm the pressurized gas, as said automobile moves forward;

means for storing combustible fuel in said vehicle;

means for burning said fuel to heat the pressurized gas;

multi-stage expansion engine means for receiving said pressurized gas, permitting it to expand, and obtaining useful work therefrom;

said fuel burning means being an external combustion furnace;

means for supplying heat from said furnace to said pressurized gas before application to said expansion engine and between stages thereof; and temperature control valve means for directing at least a portion of the pressurized gas through a bypass path to avoid additional heating by said fuel burning means as said pressurized gas is directed to said expansion engine means, to avoid overheating said multistage expansion engine components.

2. An engine as defined in claim 1, wherein means are provided for directing at least a portion of the exhaust gas from said expansion engine to said furnace.

3. A system as defined in claim 1, wherein said first heat exchanger is a countercurrent heat exchanger, and means are provided for supplying dry exhaust gases from said expansion engine to said countercurrent heat exchanger.

4. A system as defined in claim 1, wherein said pump is located in immediate proximity to the insulated body of liquified cryogenic gas.

5. A system as defined in claim 3, wherein said first heat exchanger is located in immediate proximity to said pumping means.

6. A system as defined in claim 1, wherein said insulated tank is mounted at the rear of the passenger compartment of said automobile and wherein said expansion engine means is mounted in front of said passenger compartment, and wherein said first heat exchanger means includes elongated countercurrent heat exchange means for conducting gas from said tank to said engine, and for conducting exhaust gases from said engine to the rear of the vehicle, while concurrently warming the gas and preventing the formation of ice as said liquid gas is being warmed.

7. A system as defined in claim 1 further comprising means for exhausting gases from said expansion engine means to said first heat exchanger means; and wherein said first heat exchanger means includes countercurrent heat exchange means for heating the liquid gas as it is directed forward to the expansion engine means and concurrently cooling the exhaust gases prior to venting them into the atmosphere at the rear of the automobile.

8. An engine system as defined in claim 1 wherein said pumping means includes means for delivering small quantities of said liquified gas as needed from said insulated tank.

9. A combinational engine for operating on liquified cryogenic gas and fuel as energy sources comprising:

an insulated tank for storing liquified cryogenic gas;

means for pumping said liquified gas to an elevated pressure above 100 bars;

heat exchanger means for warming said high pressure liquified gas toward the ambient whereby it changes to the gaseous state;

means for supplying additional combustible fuel;

means for burning said fuel to heat said pressurized gas;

multi-stage expansion engine means for receiving said pressurized gas, permitting it to expand, and obtaining useful work therefrom;

said fuel burning means being an external combustion furnace;

means for supplying heat from said furnace to said pressurized gas before application to said expansion engine and between stages thereof; and attempurating bypass valve means for directing at least a portion of the pressurized gas through a bypass path to avoid additional heating by said fuel burning means as said pressurized gas is directed to said expansion engine means to avoid overheating said multistage expansion engine.

10. An engine system as defined in claim 9 wherein said pumping means includes means for delivering small quantities of said liquified gas as needed from said insulated tank.

* * * * *